April 11, 1939. S. B. HUNT 2,153,564

NATURAL COLOR CINEMATOGRAPHY

Filed March 4, 1935 5 Sheets-Sheet 1

Inventor
Shirley B. Hunt

By Clarence A. O'Brien
Attorney

April 11, 1939.  S. B. HUNT  2,153,564
NATURAL COLOR CINEMATOGRAPHY
Filed March 4, 1935   5 Sheets-Sheet 2
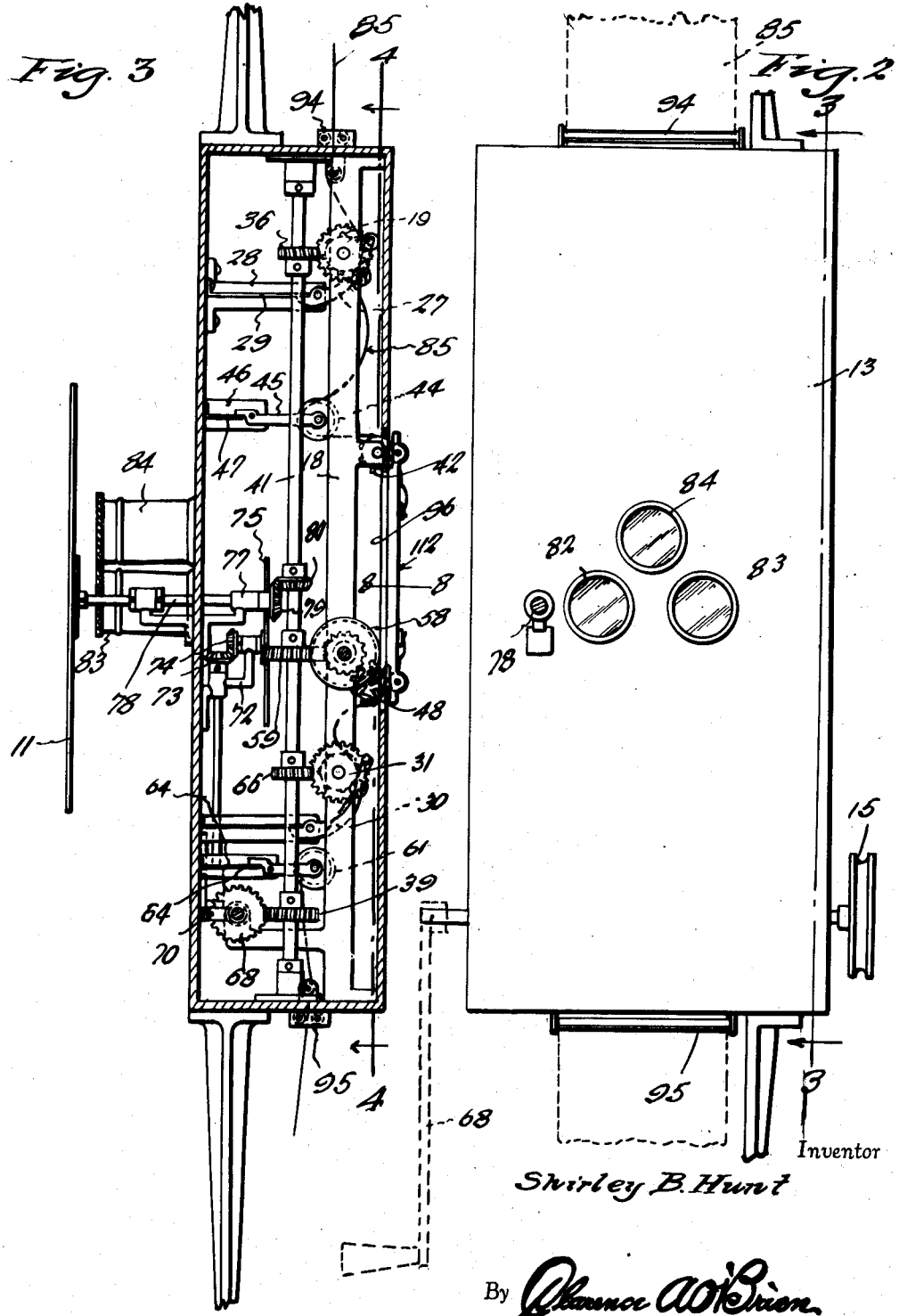
Inventor
Shirley B. Hunt
By Clarence A. O'Brien
Attorney April 11, 1939. S. B. HUNT 2,153,564
NATURAL COLOR CINEMATOGRAPHY
Filed March 4, 1935 5 Sheets-Sheet 3
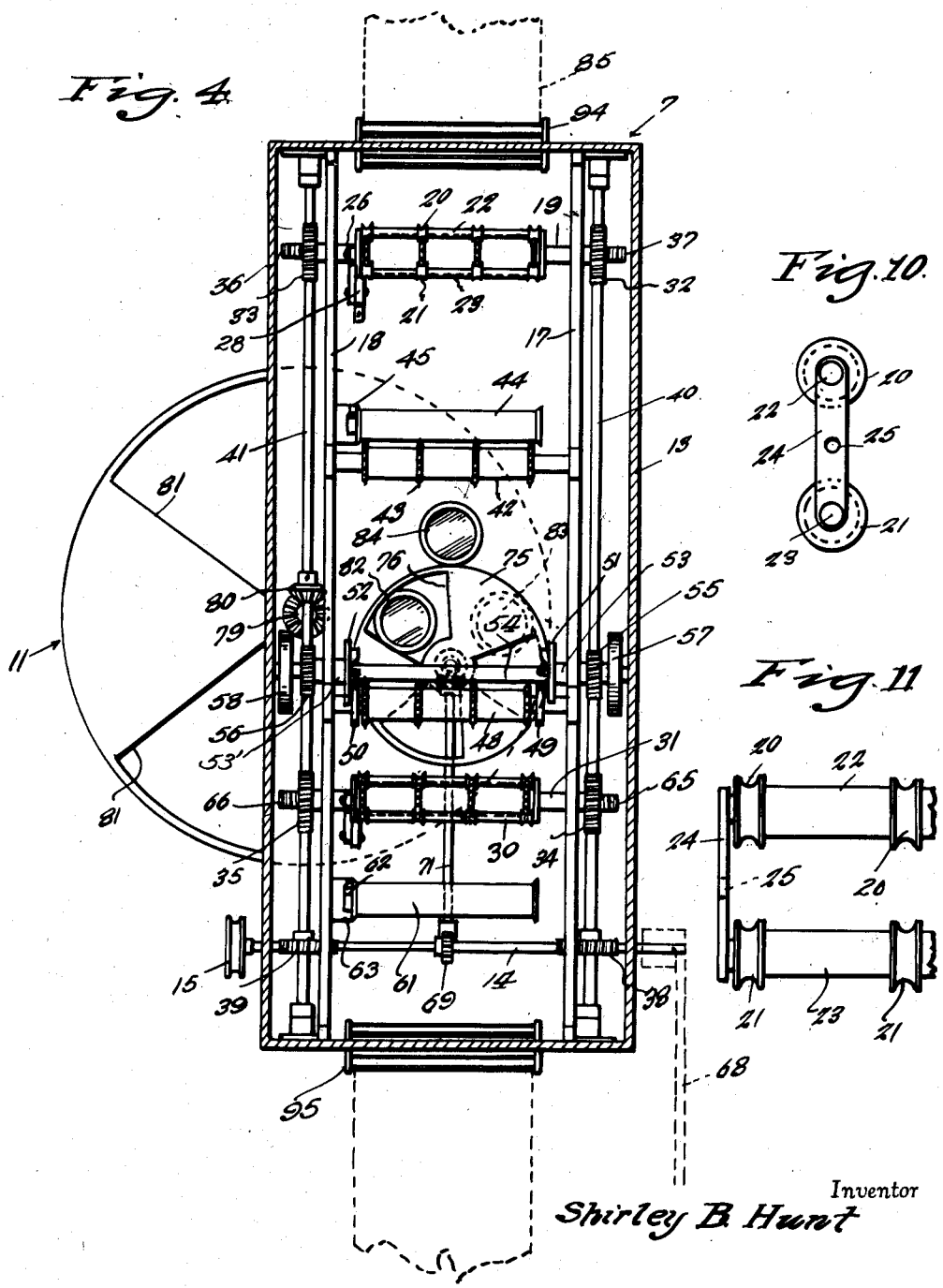
Inventor
Shirley B Hunt
By Clarence A O'Brien
Attorney April 11, 1939.  S. B. HUNT  2,153,564
NATURAL COLOR CINEMATOGRAPHY
Filed March 4, 1935  5 Sheets—Sheet 4

Inventor
Shirley B. Hunt
By Clarence A. O'Brien
Attorney

April 11, 1939.  S. B. HUNT  2,153,564
NATURAL COLOR-CINEMATOGRAPHY
Filed March 4, 1935  5 Sheets-Sheet 5
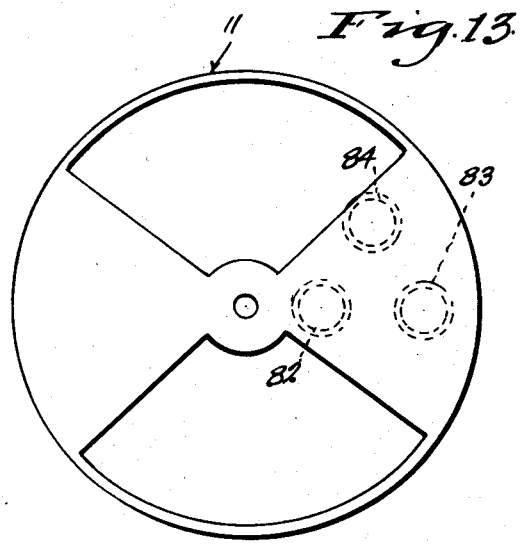
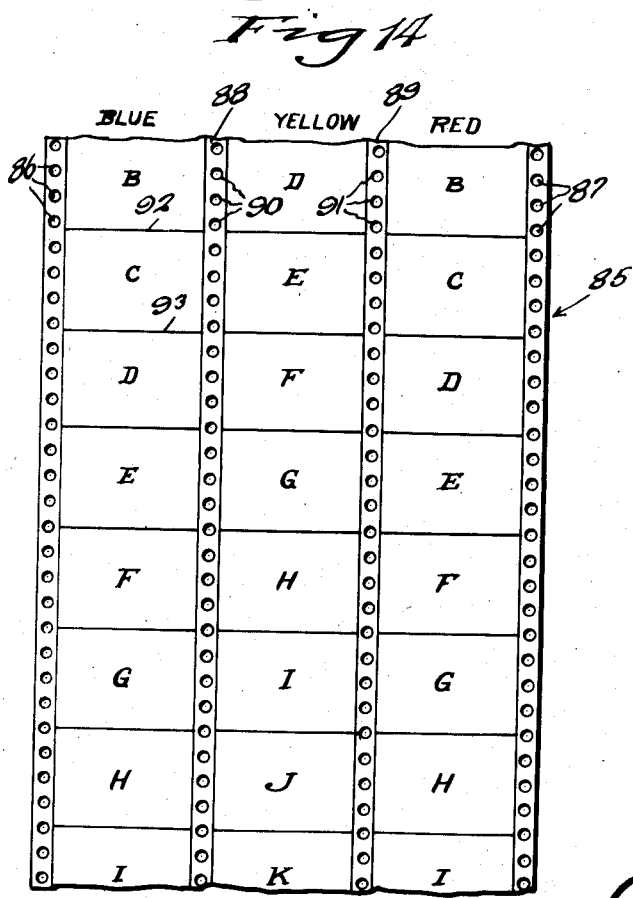
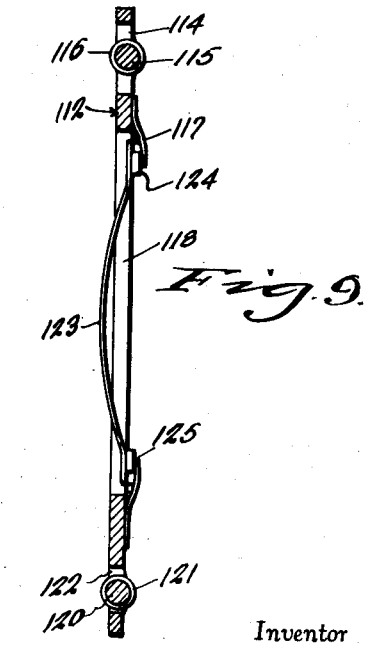
Inventor
Shirley B. Hunt
By Clarence A. O'Brien
Attorney Patented Apr. 11, 1939

2,153,564

UNITED STATES PATENT OFFICE 2,153,564

NATURAL COLOR CINEMATOGRAPHY

Shirley B. Hunt, Birmingham, Ala.

Application March 4, 1935, Serial No. 9,304

2 Claims. (Cl. 88—16.4)

My invention relates generally to means enabling cinematographing objects in their natural color values and projecting cinematographic images in these natural color values on a screen or other recording medium, and particularly to means for use in producing cinematographic positives, printing the same, and projecting the same on a screen, and an important object of my invention is to provide means of the character indicated whereby more realistic and accurately colored picture projections may be made.

Another important object of my invention is to provide means of the character indicated above whereby the persistency of vision of the eye is more perfectly availed of and less strain is imposed upon the vision of the observer, in an arrangement in which three different superimposed color impressions or images of the picture are imposd upon the eye in such a way that these impressions or images appear to occur simultaneously.

Another important object of my invention is to provide apparatus, which contains an apertured plate involving film exposing apertures of a predetermined number and relative location, together with mechanism which positively and accurately disposes the designated portions of the film before the apertures, so that imperfect overlapping of images on the projection screen, due to imperfect coordination of different parts of the film exposed, is positively prevented.

Another important object of my invention is to provide apparatus of the character indicated above in which the character and density of the source or sources of light used in the projecting may be adjusted to exactly gauge the intensity and the density of the resulting images on the screen, and for the purpose of perfectly blending the color images which are superimposed upon the screen from differently colored image producing portions of the film, uncovered by the apertures mentioned.

It is also an important object of my invention to provide apparatus of the character indicated above which can, with alterations within the skill of engineers in this art, be readily adapted to both projectors and cameras such as are employed in the cinematographic art, and in which any single film can be photographed and/or projected in black and white, simply by removing the color filters and blocking out two of the lights or camera lenses, and in which any double film can be projected or photographed in colors simply by blocking out one of the lights or camera lenses.

Another important object of my invention is to provide apparatus employable in three color photography and projecting, whereby positive films or other photographic media may be prepared for projection so that the projection will be accurate as to registration of the plurality of different color value areas and as to the relative density thereof, the selection of the density and tone of the different color producing areas being within the control of the operator whether in photographing or in projecting.

Another important object of my invention is to provide cinematographic positive film which contains three strips of "pictures", each strip containing a different primary color value, a complete naturally colored image on the screen or other registering medium resulting from projection of images of three "pictures" of the film, two of which are transversely aligned and spaced, and one longitudinally disaligned.

Other objects and advantages of my invention will be apparent from a reading of the following description in connection with the drawings, wherein for purposes of illustration I have shown a preferred embodiment of my invention.

In the drawings:—

Figure 2 is a front elevational view of the film handling mechanism.

Figure 3 is a longitudinal vertical sectional view taken through Figure 2 approximately on the line 3—3 and looking toward the left in the direction of the arrows.

Figure 4 is a transverse vertical sectional view taken through Figure 3 approximately on the line 4—4 and looking toward the left in the direction of the arrows:

Figure 9 is a vertical transverse sectional view taken through Figure 5 approximately on the line 9—9.

Figure 10 is an end elevational view of one of the tandem pressure roller assemblies cooperating with some of the sprocket arrangements of the film handling assembly.

Figure 11 is a side elevational view of an end portion of Figure 10.

Figure 13 is a front elevational view of the main shutter in front of the projecting lenses.

Figure 14 is a plan view of the film utilized.

Figure 1:
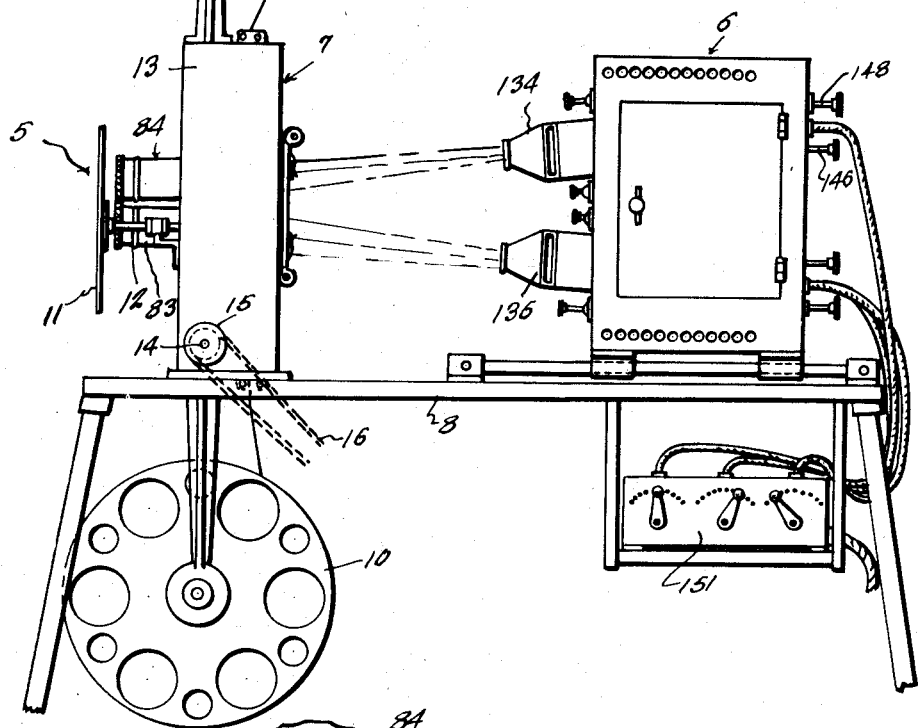
Figure 1 is a left hand side elevational view of a cinematographic projection apparatus in accordance with the present invention.
Figure 12:
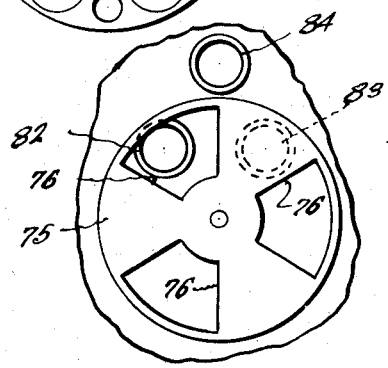
Figure 12 is an elevational view of the subsidiary shutter.
Figure 5:
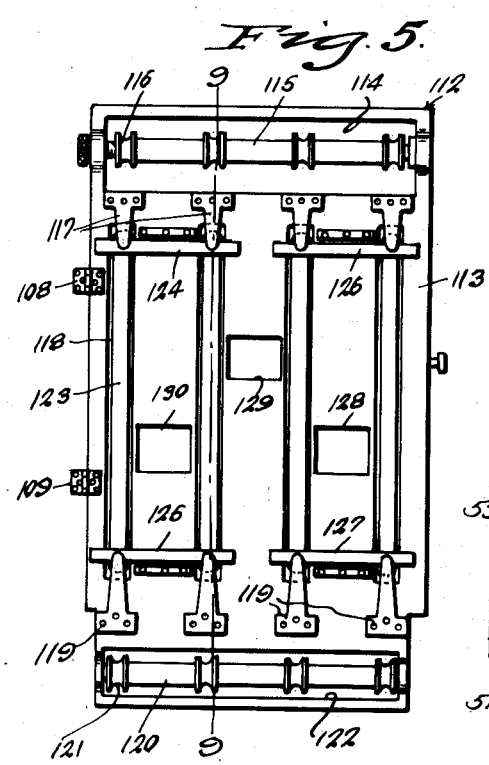
Figure 5 is an elevational view of the back side of the presser gate.

The invention may be equally applied to cinematographic cameras, cinematographic printers, and other apparatus used in color cinematography.

Referring in detail to the drawings, the numeral 5 refers generally to a projecting apparatus which includes the lantern 6 and the film handling assembly 7. These devices may be of generally conventional form, and be altered only to the extent necessary to embody the present invention. Further, these devices are usually mounted on a table 8, the film handling assembly being stationary and the lantern 6 being slidable toward and away from the film handling assembly.

The film handling assembly includes the usual film reel 9 supported thereabove and a second film reel 10 supported therebelow, the main shutter 11 on the shaft 12 extending in front of the assembly casing 13 and operating before the projecting lenses. A drive shaft 14 in the lower part of the casing has an exterior pulley 15 over which is trained the drive belt 16 operatively connected with suitable motors (not shown).

The casing 13 has the usual pair of support members 17 and 18 which carry between their upper ends the film sprocket 19 which in the present instance has four sprockets instead of the usual two. Cooperating in film pressing relation to each of the four sprockets is a vertically arranged pair of concave rollers 20 and 21 which are on separate supports 22 and 23 which are connected at the ends by yokes 24 which have a centralized hole 25 receiving a pin 26 on a pivoted arm 27 which is pivotally engaged with a stationary bracket 28, and a spring 29 alongside the stationary bracket 28 works against one arm of the arm 27 in a manner to spring-press the respective rollers 20 and 21 up against the respective ones of the four sprockets of the upper roller 19.

An exactly similar arrangement of presser rollers generally designated 30 is mounted in conjunction with and in operative engagement with respect to the lower sprocket roller 31 which is located in the lower part of the casing. The opposite ends of the roller shafts 19 and 31 extend beyond the supports 17 and 18 and have fixed thereon worm wheels 32 and 33, and 34 and 35, respectively, which are meshed with worm wheels 36, 37, 65 and 66, respectively, which are fixed on the vertical rotary shafts 40 and 41 whose opposite ends are arranged in suitable bearings on the top and bottom of the casing 13. In the usual projector the rollers 19 and 31 are present, but they are equipped with only two sprockets. In the usual projector only one of the shafts 40, 41 is present.

Somewhat below the upper sprocket roller 19 is an intermediate sprocket roller 42 containing four sprockets 43 which are aligned with the four sprockets of the sprocket roller 19 and the sprocket roller 31. The ends of the intermediate sprocket roller 42 are journaled in the supports 17 and 18, but they do not extend therebeyond as do the worm wheel equipped ends of the upper and lower sprocket rollers 19 and 31.

Above and positioned forwardly of the intermediate sprocket roller 42 which is an idle sprocket roller, is the film guide spool 44 supported by an arm 45 which is pivoted on a bracket 46 on the front of the casing 13, and a portion of the arm 45 is engaged by a spring 47 operating to push the guide spool 44 in a downward and forward direction with respect to the sprocket roller 42.

Figure 7:
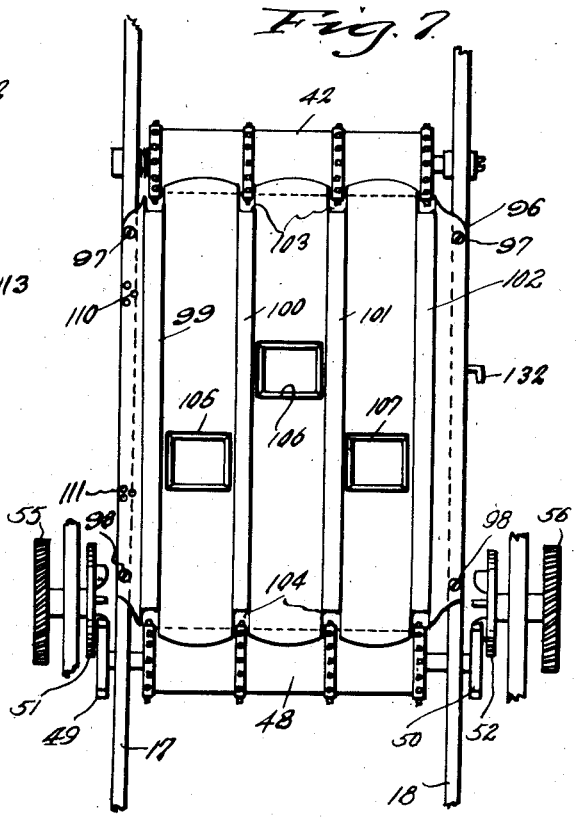
Figure 7 is an elevational view of the back side of the apertured plate showing the presser gate entirely removed therefrom.
Figure 6:
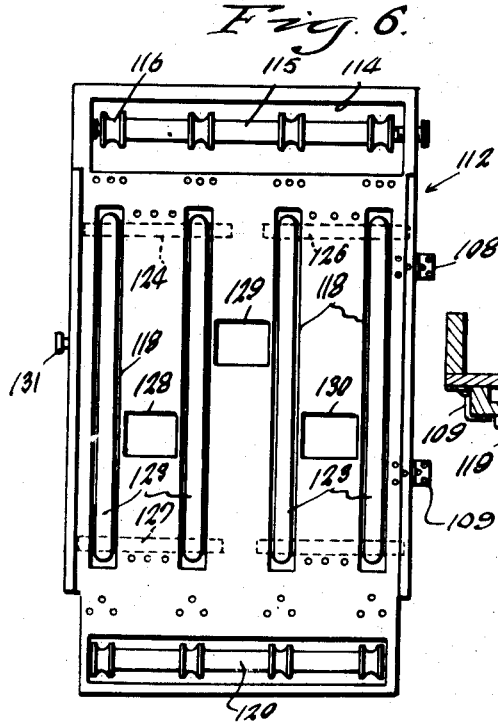
Figure 6 is an elevational view of the reverse side of Figure 5.

Just above the lower sprocket roller 31 is the sprocket roller 48 of the intermittent motion. The sprocket roller 48 contains four sprockets which are aligned with the sprockets on the other sprocket rollers described and in addition has star wheels 49 and 50 at the opposite ends thereof, as shown in Figure 7, with which cooperate the pin equipped intermittent motion wheels 51 and 52 which have collars 53 and 53', respectively, on a solid shaft 54 which is journaled in the vertical supports 17 and 18. The shaft 54 has outward of these supports the worm wheels 55 and 56, respectively, and axially outwardly of these the fly-wheels 57 and 58. The worm wheels 55 and 56 are meshed with corresponding worm wheels 59 and 60 on the rotary vertical shafts 40 and 41 whereby the sprocket roller 48 is driven at the proper intermittent rate.

Below the sprocket roller 31 is a second guide spool 61 mounted by a pivoted arm 62 on a bracket 63 and spring-pressed in a forward and downward direction by a spring 64, in a manner similar to the arrangement described in connection with the guide spool 44. The worm wheels 34 and 35 of the sprocket roller 31 are in mesh with worm wheels 65 and 66 which are fixed to the rotary shafts 40 and 41 below the worm wheels 59 and 60.

The main drive shaft 14 is horizontally supported in the lower part of the front of the casing in front of the rotary shafts 40 and 41 and their lowermost worm wheels 38 and 39 are in mesh with worm wheels 68 and 69 on the main drive shaft whereby the vertical rotary shafts 40 and 41 are driven in synchronism with each other. The main drive shaft 14 extends outwardly through the sides of the casing 13 and is provided on one end with a drive pulley 15 already alluded to and on its opposite end with a hand crank 68.

At the approximate center of the main drive shaft 14 is a small worm wheel 69 which is in mesh with a worm wheel 70 on the lower end of the auxiliary shutter driving shaft 71, the upper end of which is supported in a bracket arrangement 72 and has a beveled gear 73 in mesh with a beveled gear 74 on the stub-shaft on the auxiliary or subsidiary shutter 75 whereby the auxiliary shutter 75 is operated in back of or over the two lower projection lens assemblies to be described, and so as to leave the upper lens assembly uncovered. The auxiliary shutter 75 is provided with three equally circumferentially spaced segmental openings 76.

Immediately above the auxiliary shutter shaft is the bracket arrangement 77 which carries the rear end part of the main shutter shaft 78 which has a beveled gear 79 in mesh with a beveled gear 80 fixed on the vertical rotary shaft 41. The main shutter which operates in front of the projection lens assemblies has two openings and operates in the usual way. The auxiliary shutter 75 has its three openings arranged in such a way that, viewing the apparatus from the front, the blue picture projecting lens assembly 82 will be uncovered while the red picture projecting lens assembly 83 is covered. The yellow picture projecting lens assembly 84 is never covered by the auxiliary shutter 75, but its projection on the screen is interrupted only by the operation of the main shutter 11. It is obvious, in the case of the auxiliary shutter 75, that while the blue picture lens assembly is covered by one of the webs of the auxiliary shutter, the red picture lens assembly is uncovered.

The film which is generally designated 85 is approximately three times as wide as the ordinary motion picture film and is divided into three equally wide strips, namely, the blue color value or left hand strip, the yellow color value or central strip, and the red color value or right hand strip. The outer edges of the film are provided with the usual margins including the spaced sprocket holes 86 and 87, respectively. Between the blue color value and the yellow color value strips is a similar marginal area 88, and between the yellow color value strip and the red color value strip is another similar marginal area 89 of approximately the same width and arrangement as the marginal areas 86 and 87, and the areas 88 and 89 contain the respective sprocket holes 90 and 91 which are transversely aligned with the sprocket holes 86 and 87.

The strips are divided into frames or "pictures", the bottoms, the tops of the "pictures" being generally designated 92 and 93, as shown in the case of the picture C in the blue strip. The bottoms and the tops of the pictures in the three strips, are transversely aligned.

Each strip has successive and succeeding complete pictures thereon as indicated by the letters B, C, D, etc., and the blue color value and red color value strips have a corresponding "picture" thereon transversely aligned, but the central yellow color value strip has its "pictures" two picture spaces above the blue color value and yellow color value pictures corresponding thereto. For example, Figure 14 shows that the blue D picture has its corresponding D yellow picture two picture spaces above, while the corresponding D red picture is transversely aligned with the D blue picture. It will be observed that there is no unequal spacing or cramping arrangement of the three strips and that the sprocket hole arrangements adjacent each strip are the same on both sides, so that the mechanical effect as well as the optical effect is the same as that of three ordinary films placed in side by side relation and made to move without any chance of shifting relative to each other, in contrast to some three strip films in which the sprocket arrangements do not afford the equal spacing of the strips and the similar individuality of each of them.

The film 85 is passed downwardly through the projector casing through a triple roller arrangement 94 then behind the upper sprocket roller 19 and between it and the presser rollers 20 and 21, below which a slack occurs which runs over and in front of the idler spool 44 from the lower side of which the film passes over and to the rear of the idler intermediate sprocket roller 42 from which it is tensioned to the intermittent motion roller 48, below which another slack may occur before the film passes to the lower of the rear sprocket roller 31 and between it and its tensioning arrangement 30, whence the film passes in front of and around the idler guide 61 and then downwardly through a triple roller arrangement 95 and outwardly through the bottom of the casing 13 to the reel 10.

The front of the casing is provided with the three projecting lens assemblies 82, 83 and 84 already referred to. The assemblies 82 and 83 are transversely spaced with respect to each other and generally horizontally aligned, while the upper assembly 84 is disposed above and between the assemblies 82 and 83, so that the lens assemblies are arranged in triangular form for projecting three superimposed images on the screen. The lens assemblies converge sufficiently to produce perfect superposition of the images on the screen.

Mounted in the back of the casing 13 is the apertured plate assembly which I consider to be one of the most important features of my invention. The apertured plate assembly comprises the stationary apertured plate 96 which is attached by means of upper and lower screws 97 and 98 to lugs on the rear edges of the support members 17 and 18 in such a position thereon that the upper and lower edges of the stationary plate 96 are located in the sphere of action of the intermediate sprocket roller 42 and the intermittent motion sprocket roller 48 as shown in Figure 7 and also in Figure 3. The back side of the plate 96 has vertical ribs 99, 100, 101, and 102 which correspond in position to the sprocket hole equipped margins of the film 85 and end in slots 103 in the upper end of the plate and 104 in the lower end of the plate which respectively receive the sprockets on the sprocket rollers 42 and 48.

Disposed between the ribs 99 and 100 is the graduated aperture 105, between the ribs 100 and 101 the graduated similar aperture 106, and between the ribs 101 and 102 the graduated aperture 107. The aperture 107 is located in registry with the blue picture lens assembly 82, the aperture 105 is located in registry with the red picture lens assembly 83, while the aperture 106 is located in registry with the yellow picture lens assembly 84.

Attached to the edge of the stationary plate 96 by upper and lower hinges 108 and 109, respectively, at the points generally designated 110 and 111, respectively, is the film presser gate which is generally designated 112 and which is arranged to swing rearwardly away from the stationary apertured plate 96 to enable placing and removing the film and to enable adjusting the registration of the "pictures" of the film with the described apertures.

The presser gate 112 is composed of a plate 113 which has an elongated horizontal opening 114 at its top in which are mounted the ends of a rotatable shaft 115 incorporating the sprocket engaging roller 116.

Perpendicularly aligned under each roller 116 and attached at the lower edge of the opening 114 is a spring finger 117 which is located over the top of and below the upper end of each individual slot 118. Below each individual slot is another upwardly pointing spring finger 119 for each slot and below each finger 119 on a shaft 120 is the sprocket engaging roller 121, the shaft 120 being journaled in a horizontally elongated opening 122 in the lower end of the plate.

Figure 8:
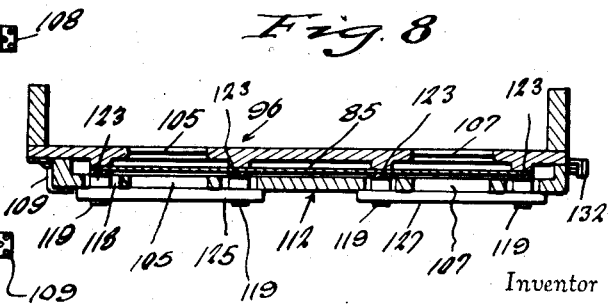
Figure 8 is a horizontal sectional view taken through the apertured plate and presser gate assembly showing the gate closed.

Disposed in the respective slots and extending substantially the entire length thereof are spring bows 123, opposite side pairs of which are connected at their upper and lower ends by bars 124 and 125 and 126 and 127 against which the upper and lower fingers 117 and 119 bear as shown in Figure 9. The forward bow of the bows 123 is evident in Figure 9. With the presser gate 112 closed as indicated in Figure 8 the bows bear upon the marginal sprocket hole equipped portions of the film which is run between the presser gate and the stationary plate 96, feeding off the sprockets on the roller 42 directly to a position between the plate and the gate and onto the lower sprocket roller 48 of the intermittent motion, so that the film is both rigidly and positively guided and held flat in alignment while passing between the rollers 42 and 48, and thereby held in perfect registration with the apertures 105, 106 and 107, with which the apertures 128, 129 and 130 of the presser gate are exactly registered. The bows 123 are permitted a certain amount of vertical movement thereof to permit correction of the vertical and horizontal alignment of the pictures on the film with the apertures, as required for accurate framing, without displacing the operative engagement of the upper and lower fingers 117 and 119 with the bars which hold the bows together and in pairs. Suitable means is provided for accurate framing which once attained should not require to be altered under ordinary circumstances. A catch 131 on the presser gate 112 is arranged to engage a detent 132 on the plate 96 so that the presser gate will remain closed and in adjusted position when in the closed position.

It is obvious that the drive mechanism being operatively connected to the various sprocket rollers and the sprocket rollers to each other in the manner indicated, the feed of the film will be definitely accurate as to position and rate and that with the apertured plate assembly the framing of the pictures on the film will be substantially perfect at all times, so that projection by means of the lens assemblies of the three differently colored predeterminedly positioned pictures will be an accurate superposition of the three pictures.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. Natural color motion picture projecting apparatus of the character described comprising means for passing film before projecting lens means, an apertured plate having aperture means registered with the lens means, a presser gate for pressing the film against the back of said apertured plate, means to feed said film between the apertured plate and said gate to register picture means on the film with said apertures and with said lens means, said film including a plurality of longitudinal strips, said lens means including a projecting lens for each strip, and said apertured plate and said gate being formed with apertures and openings respectively registering with the lenses, and auxiliary shutter means interposed between said apertured plate and the projecting lenses and arranged to alternately cover and expose certain of said projecting lenses while never covering another of said lenses.

2. Natural color motion picture projecting apparatus of the character described comprising means for passing a film before projecting lens means, an apertured plate having aperture means registered with the lens means, a presser gate for pressing the film against the back of said apertured plate, means to feed said film between the apertured plate and said gate to register picture means on the film with said apertures and with said lens means, said film including a plurality of longitudinal strips, said lens means including a projecting lens for each strip, and said apertured plate and said gate being formed with apertures and openings respectively registering with the lenses, and auxiliary shutter means interposed between said apertured plate and the projecting lenses and arranged to alternately cover and expose certain of said projecting lenses while never covering another of said lenses, said apparatus including a conventional shutter operating in front of the projection lenses.

SHIRLEY B. HUNT.